United States Patent [19]

Johnson

[11] 4,151,576
[45] Apr. 24, 1979

[54] TRANSFORMER SECONDARY DISCONNECT AND SHORTING SWITCH

[75] Inventor: Joseph F. Johnson, Plainville, Conn.

[73] Assignee: General Electric Company, New York, N.Y.

[21] Appl. No.: 846,950

[22] Filed: Oct. 31, 1977

[51] Int. Cl.² .................. H02H 7/04; H01H 9/00
[52] U.S. Cl. ................... 361/35; 200/50 AA; 200/51.10
[58] Field of Search .............. 200/1 R, 50 AA, 50 C, 200/51.09, 51.1, 51.11; 336/107; 361/35, 38, 42, 115, 335, 336

[56] References Cited

U.S. PATENT DOCUMENTS

| | | | |
|---|---|---|---|
| 1,496,891 | 6/1924 | Kimmel | 200/51.1 X |
| 3,370,140 | 2/1968 | Betts | 200/51.1 |
| 3,512,043 | 5/1970 | Jaaksoo et al. | 361/35 |
| 4,053,724 | 10/1977 | Llona | 200/51.1 X |

Primary Examiner—James R. Scott
Attorney, Agent, or Firm—Robert A. Cahill; Walter C. Bernkopf; Philip L. Schlamp

[57] ABSTRACT

An insulative body, affixed to a switchboard, mounts a pair of spring biased, reciprocating, conductive plungers individually wired to each side of a neutral current transformer secondary winding. With a drawout circuit breaker in its engaged position, the plungers retract in response to engagement with breaker mounted conductive pads wired to a breaker static trip unit, thereby completing a circuit between the secondary winding and the breaker trip unit. With the breaker in its disengaged position, the plungers spring to extended positions in disengaging relation with the pads, while plunger mounted switch contacts connect the winding sides together through a shorting bar or a resistor.

7 Claims, 4 Drawing Figures

TRANSFORMER SECONDARY DISCONNECT AND SHORTING SWITCH

BACKGROUND OF THE INVENTION

In circuit breaker drawout installations where the circuit breaker is equipped to afford overcurrent and ground fault circuit protection, separate phase current transformers, utilized to individually sense the currents flowing in the respective phase buses of the circuit to be protected, are typically mounted integrally with the breaker and their secondary windings permanently wired to a static trip unit, also integrally mounted with the breaker. For circuits utilizing neutral buses, a separate current transformer must be utilized to sense current flowing in the neutral bus if the existence of a ground fault is to be properly recognized. This neutral current transformer, located externally of the breaker in embracing relation with the neutral bus mounted within the switchboard, must also have its secondary winding wired into the breaker static trip unit. Since, in drawout installations, the breaker is mounted for movement relative to the switchboard between engaged and disengaged positions, the circuit connection between the trip unit and the neutral current transformer must be made via trailing cable of sufficient slack to accommodate this breaker movement. Within the congested confines of a switchboard, the accommodation of a trailing cable in a manner to prevent fouling can be difficult. Moreover, repeated flexure of the trailing cable can produce wire breakage.

An alternative approach to completing a circuit between the neutral current transformer and the drawout breaker trip unit is to wire the transformer secondary to a stab connector mounted by the switchboard. A complementing stab connector, mounted by the breaker, is wired to the trip unit. When the breaker is racked into its engaged position, these two stab connectors mate or plug together, completing the circuit between the neutral transformer and the breaker trip unit. To insure proper mating, these stab connectors must be relatively mounted in rather precise alignment, requiring close manufacturing tolerances. Also of concern is the fact that while the stab connectors are unmated, the neutral transformer secondary winding is open-circuited. Current then flowing through the switchboard neutral bus can induce extremely high voltages in the secondary winding capable of breaking down winding insulation. Moreover, this high secondary voltage condition poses an extreme, hidden hazard to operating and maintenance personnel.

It is accordingly an object of the present invention to provide an improved disconnect for making and breaking a circuit between the secondary winding of a switchboard mounted current transformer and a drawout circuit breaker mounted trip unit incident to movement of the breaker between its engaged and disengaged positions with respect to the switchboard.

An additional object is to provide a disconnect of the above character, wherein the disconnect parts respectively mounted by the switchboard and the breaker accommodate considerable degree of misalignment and breaker skew.

A further object is to provide a disconnect of the above character which includes switch means automatically operative, when the transformer is disconnected from the trip unit, to prevent the secondary winding from being open-circuited, and thus to preclude the development of a high voltage condition therein.

Another object of the present invention is to provide a disconnect of the above character which is inexpensive to manufacture, convenient to install, and reliable in operation.

Other objects of the invention will in part be obvious and in part appear hereinafter.

SUMMARY OF THE INVENTION

In accordance with the present invention, there is provided a disconnect for connecting and disconnecting the secondary winding of a switchboard mounted current transformer to a circuit breaker mounted static trip unit incident to racking movement of the breaker between its engaged and disengaged positions with respect to the switchboard. The disconnect is uniquely constructed to accommodate a considerable degree of misalignment and skewing of the breaker relative to the switchboard without jeopardizing its ability to complete the circuit between the breaker and the transformer.

More specifically, the disconnect of the present invention includes an insulative body suitably mounted to the switchboard. The disconnect body, in turn, reciprocally mounts a pair of spring biased, conductive plungers individually wired to the two sides of the transformer secondary winding. The disconnect further includes a pair of conductive pads mounted by the circuit breaker and individually wired to the breaker trip unit. As the breaker is racked into its engaged position, the pads individually engage the rounded forward ends of the plungers, thereby completing the circuit between the transformer and trip unit. With the arrival of the breaker in its engaged position to fully mate the primary switchboard-breaker stab connectors, the plungers are forced rearwardly to retracted positions against the forces of their bias springs which serve to provide adequate contact pressure between the plungers and the pads pursuant to producing a sound circuit connection between the transformer and trip unit. The surface area of the pads is made large relative to the plunger cross-sectional area, and thus breaker alignment is not critical. Moreover, since the respective electrical contacting engagements of the plungers with their associated pads are, to a large extent, independent, considerable skewing of the breaker as it is racked into its engaged position is tolerated. This is in contrast to male-female type disconnects typically utilized in drawout breaker installations, wherein alignment of the connector parts is critical and breaker skew typically damages the disconnect.

As an additional feature of the present invention, the switchboard mounted disconnect body mounts a conductive circuit element which is switched across the transformer secondary winding as the breaker is racked out of its engaged position so as to preclude the secondary winding from being open-circuited when the pads are removed from electrical contacting engagement with the plungers. To this end, the plungers carry switch contacts which electrically engage opposed terminal ends of the circuit element as the plungers spring to their extended positions in following the movement of the breaker out of its engaged position; the pads ultimately being removed from contacting engagement with the forward ends of the plungers. The circuit element may be a shorting bar or a resistor, either one of which being effective in preventing the development of a high voltage condition in the transformer secondary winding while its circuit connection with the trip unit is broken.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in conjunction with the accompanying drawing, in which.

Corresponding reference numerals refer to like parts throughout the several views of the drawing.

DETAILED DESCRIPTION

Figure 1:
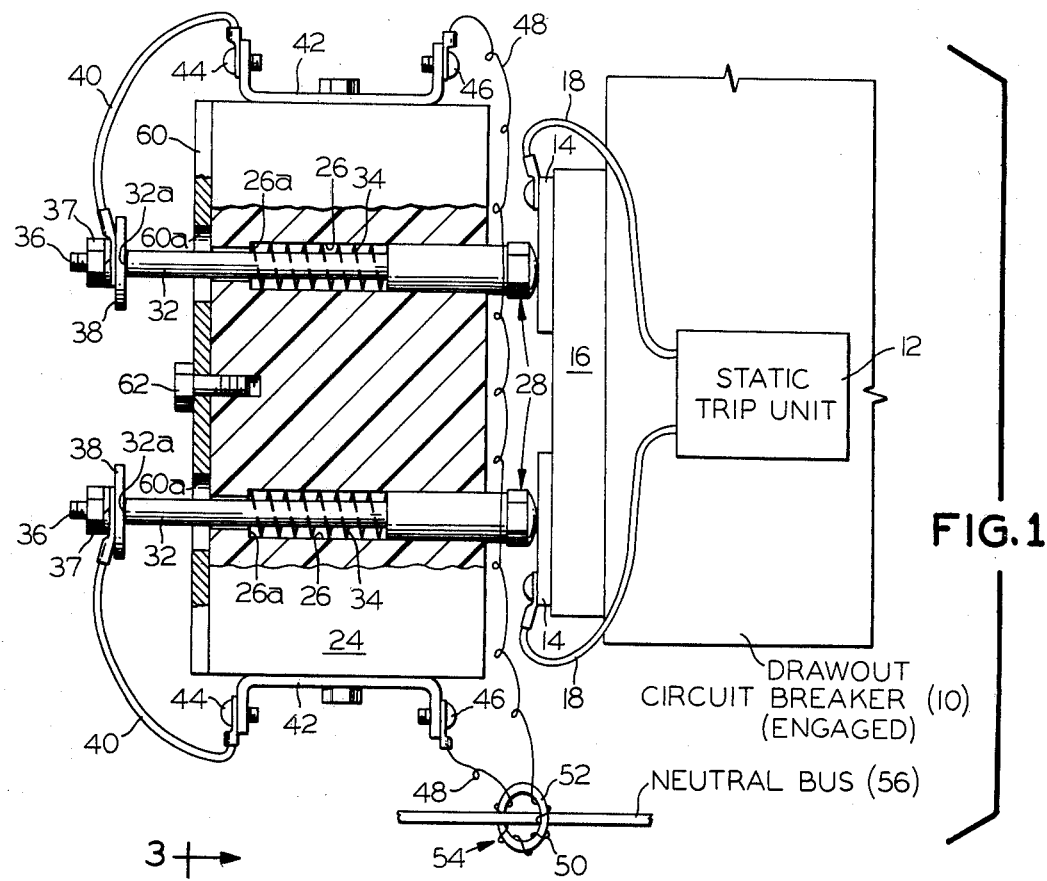
FIG. 1 is a plan view, partially diagrammatical and partially broken away, of a transformer disconnect and shorting switch constructed in accordance with the present invention and illustrated in its circuit connecting condition.
Figure 2:
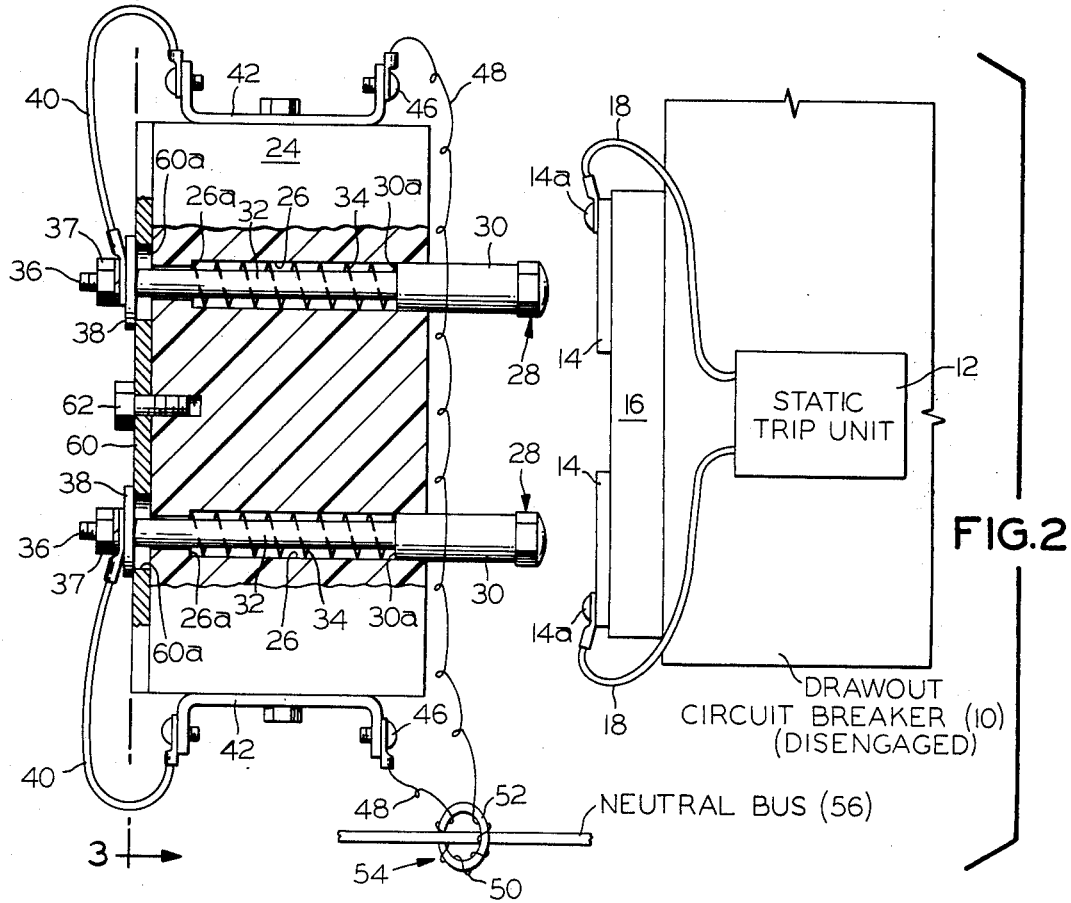
FIG. 2 is a plan view, partially diagramatical and partially broken away, of the transformer disconnect and shorting switch of FIG. 1, illustrated in its circuit disconnecting condition.

The transformer disconnect and shorting switch of the present invention, as best seen in FIGS. 1 and 2, has particular application in drawout switchboard installations, wherein a circuit breaker, indicated diagrammatically at 10, is mounted to a switchboard by a suitable racking mechanism (not shown) for movement between an engaged position (FIG. 1), wherein the primary switchboard-circuit breaker disconnect contacts are electrically mated, and a disengaged position (FIG. 2), wherein the primary disconnect contacts are unmated. The current trend is to utilize static trip circuit breakers in industrial switchboard applications, wherein, instead of a magnetic or thermal-magnetic trip unit, an integrally mounted electronic static trip unit, as diagrammatically illustrated at 12, is utilized. Current transformers (not shown) are then inductively coupled with each phase of the protected circuit pursuant to developing secondary current signals indicative of the currents flowing in each breaker pole. These current signals are supplied to the static trip unit for processing to determine the existence of an overcurrent condition. If an overcurrent condition does exist, the trip unit initiates a trip function with or without appropriate delay, depending on the severity of the condition. In recent circuit breaker designs, the phase current transformers are mounted integrally with the circuit breaker in embracing relation with the breaker load straps. Thus the transformer secondary windings can be, for all practical purposes, permanently wired into the static trip unit.

The modern trend in circuit protection is to include ground fault protection, as well as over current protection, in circuit breakers. As is well recognized, current of magnitudes well below established overcurrent trip threshold levels flowing through a phase-to-ground fault can produce irreparable damage to busway and connected loads.

Providing ground fault protection capability in a static trip circuit breaker is a relatively simple and inexpensive matter. The current signals appearing in the phase current transformer secondary windings are simply also applied to suitable residual circuitry, such as a differential current transformer, for the purpose of resolving the vectorial summation of the phase currents. If this summation is not zero, then not all of the current going out to the load is returning to the source by way of the phase conductors. This situation can only be accounted for by the fact that phase current is returning to the source as ground fault current flowing through an unintended ground path. The static trip unit can be readily supplemented with additional circuitry for processing current imbalance signals developed by such residual circuitry pursuant to initiating a ground fault trip function.

In many industrial power distribution circuits, an additional, neutral conductor or bus is utilized. To recognize a ground fault on such distribution circuits, the vectorial summation of the currents flowing in the phase buses as well as the neutral bus must be resolved. Thus a current transformer must be inductively coupled with the neutral bus and its secondary winding wired into the trip unit residual circuitry. Since the distribution circuit neutral is not typically switched by the circuit breaker, neutral current is not routed through a breaker pole. Consequently, the neutral current transformer must be mounted externally of the circuit breaker with its secondary winding connected to the breaker trip unit via external leads. In drawout switchboard applications, the neutral current transformer is disposed in embracing relation with a neutral bus mounted within the switchboard, and its secondary winding must be connected to the static trip unit of a circuit breaker mounted for movement relative to the switchboard. The transformer disconnect and shorting switch of the present invention is uniquely structured to reliably make and break this circuit between the circuit breaker trip unit and an external neutral current transformer.

To this end, the transformer disconnect and shorting switch includes a pair of spaced, generally rectangular, conductive pads 14 of, for example copper, mounted to the planar rear surface of an insulative block 16, which, in turn, is affixed to a rearward portion of drawout circuit breaker 10. Binding head screws 14a serve to terminate a pair of lead wires 18 running from static trip unit 12 in separate electrical connection with pads 14.

Mounted to the switchboard via a suitable bracket 20 affixed to a switchboard frame member 22 (FIG. 3) is an insulative body 24. A pair of stepped, through-bores 26 formed in body 24 each serve to reciprocally mount a plunger, generally indicated at 28 and formed of a conductive metal such as copper. Each plunger is formed having an enlarged diameter forward end portion 30 protruding from its respective bore 26 to present a rounded nose in confronting relation with a different one of the breaker mounted pads 14. The reduced diameter rearward portion 32 of each plunger passes through the reduced diameter rearward portion of its respective bore 26 for extension beyond the rearward end of insulative body 24. A helical compression spring 34, accommodated in each bore 26, acts between plunger shoulder 30a and a bore shoulder 26a to bias the plungers forwardly in the direction of drawout breaker 10 to extended positions seen in FIG. 2.

The rearward end portion of each plunger is formed having a further reduced diameter threaded shank 36 on which a nut 37 is received to clamp a large diameter, conductive washer 38 against the shoulder 32a formed between the shank and plunger portion 32 and also to terminate one end of a separate lead wire 40. The other ends of these wires are terminated at separate U-shaped terminal strips 42, affixed to body 24, by binding head screws 44. Also terminated at terminal strips 42 under binding head screws 46 are one end of separate lead wires 48 running to the two sides of a secondary winding 50 wound on the toroidal core 52 of a neutral current transformer, generally indicated at 54. The core is disposed in embracing relation with a switchboard neutral bus 56 such that neutral current flow therein induces a proportional neutral current signal in secondary winding 50 which is supplied via leads 48, terminal strips 42 and leads 40 to conductive plungers 28.

It is thus seen that when drawout circuit breaker 10 is racked from its disengaged position of FIG. 2 toward its engaged position of FIG. 1, the breaker mounted pads 14 move into electrical contacting engagement with the noses of plungers 28, thereby connecting the two sides of neutral current transformer secondary winding 50 to separate inputs of breaker mounted static trip unit 12 via separate leads 18. With the arrival of the breaker at its engaged position, the plungers are pushed rearwardly to retracted positions against the bias of their respective springs 34, as seen in FIG. 1; the springs operating to maintain the requisite contact pressure between the plungers and pads for preserving the continuity of the circuit between the secondary winding 50 and trip unit 12. It is seen that, since the plungers reciprocate independently of each other and are provided with rounded noses, skewing of the breaker incident to racking movement into its engaged position will not jeopardize circuit continuity. Moreover, since the surface area of the pads can be made large relative to the cross-sectional area of the plungers, precise mounting alignment of block 16 to breaker 10 and body 24 to the switchboard is not required. Also, the plungers can be afforded relatively long strokes, thus providing considerable leeway in the fore and aft positional mounting of body 24 to switchboard frame 22.

Figure 3:
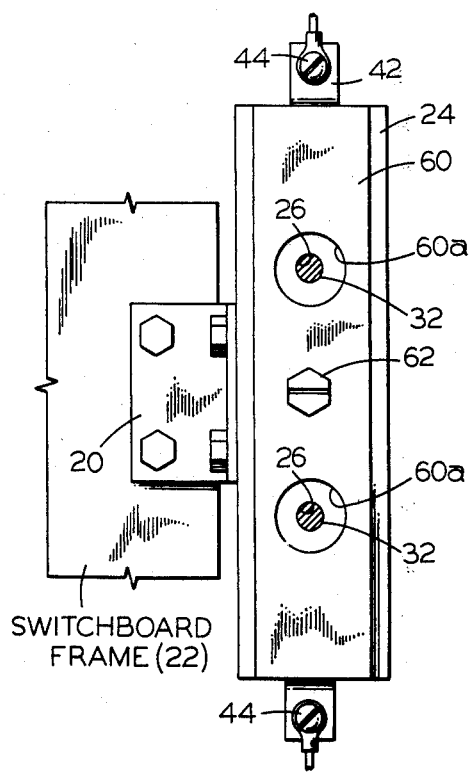
FIG. 3 is a sectional view taken along line 3—3 of FIG. 2.

As an additional feature of the present invention, the disconnect includes provisions for preventing the neutral transformer secondary winding from being open-circuited when the circuit breaker 10 is backed out to its disengaged position of FIG. 2 and the plungers no longer engage the pads to connect the secondary winding into the static trip unit. As previously noted, current flowing in the neutral bus 56 while the secondary winding is open-circuited will produce extremely high voltages across the secondary winding constituting a hazard to the winding insulation and personnel as well. To preclude the establishment of this high voltage condition in accordance with one embodiment of the invention, a shorting bar 60, best seen in FIG. 3, is affixed across the rear face of insulative body 24 by suitable means such as one or more screws 62. The shorting bar is formed with large clearance holes 60a in registry with bores 26 through which the reduced diameter portions 32 of plungers 28 protrude. These clearance holes are of sufficient diameter to preclude electrical contact between the plunger portions 32 and shorting bar 60. However, the diameters of conductive washers 38 affixed to the rearward ends of the plungers exceed the clearance hole diameters such that, when the plungers spring to their extended positions of FIG. 2, the washers abut the shorting bar. Thus, the washers serve as plunger stops and shorting switch contacts which close on the shorting bar to short-circuit the two sides of neutral current transformer secondary winding 50 when its circuit connection with trip unit 12 is broken.

Figure 4:
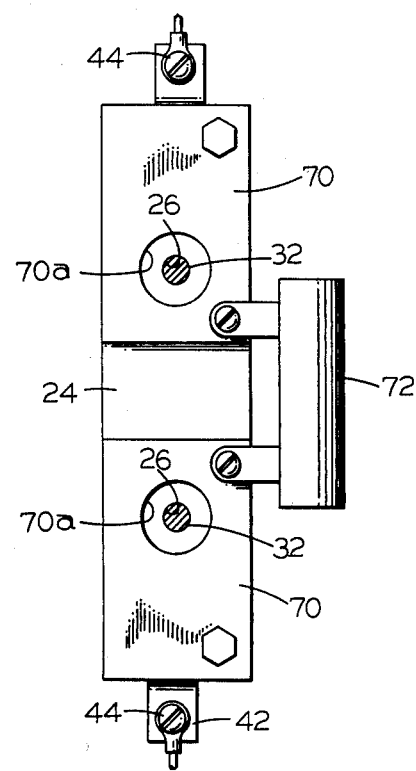
FIG. 4 is a sectional view similar to FIG. 3, illustrating an alternative embodiment of the invention.

In some applications it may be preferred to terminate the neutral current transformer secondary winding in some finite resistance rather than a short-circuit. In this case, the shorting bar of FIG. 3 is replaced by a pair of spaced, conductive plates 70 suitably affixed to the rear face of insulative body 24 as seen in FIG. 4. Each plate is provided with a clearance hole 70a in registry with one of the plunger bores 26. The plates are electrically interconnected through a resistor 72. It is thus seen that when the plungers spring to their extended positions of FIG. 2, the washers 38 abut plates 70 to switch resistor 72 across secondary winding 50.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sence.

Having described my invention, what I claim as new and desire to secure by Letters Patent is:

1. A disconnect for making and breaking a signal circuit between the secondary winding of a switchboard mounted neutral current transformer and the static trip unit of a circuit breaker mounted by electrical drawout apparatus for movement between engaged and disengaged positions with respect to the switchboard, said disconnect including, in combination:
   A. a pair of planar conductive pads mounted in electrically isolated interrelation to the drawout apparatus and separately wired to the static trip unit;
   B. an insulative body mounted to the switchboard;
   C. means forming a pair of bores in said body;
   D. a separate conductive plunger having a rounded forward end and reciprocally mounted in each said bore, said plungers being respectively wired to the two sides of the neutral current transformer secondary winding;
   E. a separate spring accommodated in each said bore for biasing each said plunger forwardly toward the drawout apparatus to an extended position;
   F. an electrically conductive element carried by said body; and
   G. a switch contact carried by each said plunger, each said switch contact electrically engaging said element while its associated plunger is in its extended position;
   H. whereby, with the drawout apparatus in its extended position, the secondary winding and static trip unit are electrically disconnected and the plungers are in their respective extended positions to switch said element across the two sides of the neutral current transformer secondary winding, and, upon movement of the drawout apparatus toward its engaged position, said pads individually engage said forward ends of said plungers to complete the signal circuit between the secondary winding and static trip unit, the area of the planar surface of each said pad normal to the axis of its associated plunger being large relative to the cross-sectional area of its associated plunger, said plungers being pushed rearwardly to retracted positions in response to the movement of the drawout apparatus into its engaged position while maintaining signal circuit continuity and, coincidentally, switching said element out from across the two sides of the neutral current transformer secondary winding.

2. The disconnect defined in claim 1, wherein said conductive element is a shorting bar.

3. The disconnect defined in claim 2, wherein said bores are formed through said body with said plungers reciprocally mounted therein extending forwardly and rearwardly beyond said body, the two sides of the secondary winding being separately wired to exposed rearward end portions of said plungers, and said switch contacts being mounted on said exposed rearward end portions of their associated plungers.

4. The disconnect defined in claim 3, wherein said shorting bar is formed having a clearance hole in registry with the rearward end of each said bore and through which said rearward end portion of the associated plunger extends, the rearward end of each said plunger terminating in a threaded shank on which is received a nut, said switch contact being constituted by a conductive washer clamped on each said shank by one of said nuts, said washers bridging said clearance holes to electrically engage said shorting bar as said plungers assume their extended positions, said nuts electrically terminating the two sides of the secondary winding in separate electrical connections with respective washers and plungers.

5. The disconnect defined in claim 1, wherein said conductive element is a resistor having a pair of spaced electrical terminations individually engaged by said switch contacts.

6. The disconnect defined in claim 5, wherein said bores are formed through said body with said plungers reciprocally mounted therein extending forwardly and rearwardly beyond said body, the two sides of the secondary winding being separately wired to expose rearward end portions of said plungers, and said switch contacts being mounted on said exposed rearward end portions of their associated plungers.

7. The disconnect defined in claim 6, wherein said resistor electrical terminations comprise conductive plates, each having formed therein a clearance hole in registry with the rearward end of a different one of said bores and through which said rearward end portion of the associated plunger extends, the rearward end of each said plunger terminating in a threaded shank on which a nut is received, said switch contact being constituted by a conductive washer clamped on each said shank by one of said nuts, said washers bridging said clearance holes to electrically engage said plates as said plungers assume their extended positions, and said nuts electrically terminating the two sides of the secondary winding in separate electrical connections with respective washers and plungers.

* * * * *